United States Patent [19]

Oelsner

[11] Patent Number: 4,957,675
[45] Date of Patent: Sep. 18, 1990

[54] METHOD AND APPARATUS FOR PREPARING CASEINATES

[75] Inventor: Wolfgang Oelsner, Stuttgart, Fed. Rep. of Germany

[73] Assignee: Werner & Pfleiderer GmbH, Fed. Rep. of Germany

[21] Appl. No.: 341,367

[22] Filed: Apr. 21, 1989

[30] Foreign Application Priority Data

May 4, 1988 [DE] Fed. Rep. of Germany ....... 3815113

[51] Int. Cl.$^5$ .......................... B29B 9/12; B29C 47/40
[52] U.S. Cl. ..................................... 264/118; 264/140; 264/202; 264/211.23; 264/349; 366/85; 366/88; 425/202; 425/204; 425/206; 425/382.3; 425/382.4; 426/512
[58] Field of Search .............. 264/202, 211.21–211.24, 264/349, 140–141, 118; 425/205–209, 204, 202, 382.3, 381, 382.4, 382 R; 366/85, 88; 426/512

[56] References Cited

U.S. PATENT DOCUMENTS

| | | | |
|---|---|---|---|
| 2,431,274 | 11/1947 | Osborne | 264/211.21 |
| 2,857,624 | 10/1958 | Hanzel et al. | 264/141 |
| 3,256,115 | 6/1966 | Stearns et al. | 264/141 |
| 3,362,044 | 1/1968 | Irving | 425/202 |
| 4,097,213 | 6/1978 | McComb et al. | 425/381 |
| 4,171,668 | 10/1979 | Ratcliffe | 264/202 |
| 4,381,184 | 4/1983 | Hurni et al. | 425/382 R |
| 4,605,444 | 8/1986 | Wiedmann et al. | 264/53 |
| 4,607,797 | 8/1986 | Enikolopow et al. | 425/208 |

FOREIGN PATENT DOCUMENTS 2742083 11/1982 Fed. Rep. of Germany .
2053788 2/1981 United Kingdom .

Primary Examiner—Jeffery Thurlow
Attorney, Agent, or Firm—Laff, Whitesell, Conte & Stuart

[57] ABSTRACT

In a method for preparing caseinates, including the introduction of casein, alkaline solutions or basic salts and water into an extruder, the constituents being thoroughly mixed together and then subjected to an increase in pressure and temperature under the influence of return elements, it is provided, to achieve a finished basic product while avoiding a separate comminuting stage following the extrusion process, that the pressure built-up under the influence of return elements or kneading units takes place directly in front of the discharge end of the extruder and the product be discharged freely through this end of the extruder. An apparatus is used to carry out the method, this apparatus being characterised in that the return elemnts or return kneading units are arranged directly in front of the discharge end of the extruder and the discharge end of the extruder is open essentially without any reduction in cross-section relative to the free cross-section of the extruder.

11 Claims, 1 Drawing Sheet

METHOD AND APPARATUS FOR PREPARING CASEINATES

FIELD OF THE INVENTION

The invention relates to a method and an apparatus for preparing caseinates, comprising the introduction of casein, alkaline solutions or basic salts and water into an extruder, the constituents being thoroughly mixed together and then subjected to an increase in presure and temperature under the influence of return elements.

BACKGROUND OF THE INVENTION

A method of this kind is known from U.S. Pat. No. 4,605,444. In this previously known method the mixture of casein and reagents is subjected to a chemical reaction and sterilization by the action of return elements during the build-up of pressure and temperature. Following the return elements there is also a conveying zone, at the end of which a further build-up of pressure occurs by virtue of an extrusion die. The basic product is extruded by this die.

A method is known from German published patent application No. 27 42 083, in which the product having a relatively low basic moisture content is processed, but a substance releasing inert gas is added by mixing to the mixture fed to the extruder, this gas being intended to have a protective gas effect on the product and to prevent thermal damage. In this previously known method no return elements are provided and an extrusion die is situated at the extruder outlet.

British patent specification No. 2,053,788 disclosed a mixing element which is arranged at the extruder end of a food extruder and which causes an interruption in the conveyed flow of material and is arranged ahead of the die on the discharge side.

In the known methods for the extrusion by boiling of caseinates extrusion takes place through nozzles bores, the lengths which are produced in this manner then being granulated. This calls for very high cutting speeds of over 4500 revolutions per minute. At the same time there is the risk of agglomerates forming in the protective hood during granulation at the discharge end.

Alternatively, extrusion can be effected through nozzle bores directly into a vacuum tunnel. The disadvantages of this method is that it is susceptible to trouble, e.g. during starting and cutting in the tunnel, and requires a relatively large amount of space.

Moreover, in the previously known method of water content of the product is, at 18 to 21%, relatively high so that it is difficult to achieve the desired ultimate consistency.

SUMMARY OF THE INVENTION

It is accordingly the object of the present invention to create a method and an apparatus for preparing caseinate products, in which apparatus a separate device arranged after the extruder at the discharge end for comminuting the product is not required.

This problem is solved by a method of the type mentioned in the introduction in that the pressure build-up under the influence of return elements or return kneading units takes place directly in front of the discharge end of the extruder and the product is discharged freely through this end of the extruder. These return elements are parts of the screws producing a feed against or reverse to the general feed direction of the extruder.

It is found, surprisingly, that in this way caseinate is discharged in a comminuted form even though, when in a hot-extruded state, the caseinate has an extremely viscous and glutinous consistency. In addition, a discharge of comminuted caseinate can be achieved independently of the specially used reaction for neutralizing the casein.

The method provided in accordance with the invention also meets strict hygienic requirements because sufficient sterilization can be achieved and no hygienic problems occur in a downstream situated comminuting plant. Moreover, the method can be implemented in an operationally reliable and problem-free manner with acid-precipitated casein in powder or granular form having a moisture content of up to 20% and when using reagents, such as soda lye, calcium oxide, calcium hydroxide, sodium carbonate and the like which can be added by metering in powder form, as a suspension or solution.

The distribution of the product on the discharge side is based on the sudden change in volume, the constriction of the product length taking place in the wedge area of the extruder screw and being aided by the abruptly occurring expansion, which is known per se, because of the water content in the caseinate being subjected to pressure. The expanded comminuted product is simply thrown out of the open extruder and can be transfered directly by a conveyor.

In the preparation of phenolic moulding compounds in an extruder it is known per se to discharge the compounds openly, these compounds then falling out in lump form at the discharge end of the extruder. However, with phenolic moulding compounds of this type the specific problems of caseinate preparation do not arise; in particular, with these known methods a build-up of pressure by recirculating elements or kneading elements arranged directly in front of the discharge end is not achieved either.

When carrying out the method according to the invention a water content of between 6 and 15% is preferably provided for. Such a low water content aids the achievement of the desired consistency of the initial product.

In particular, the proportion of separately added water can be between 0 and 18% relative to the total quantity of mixture in the extruder. This means that, beyond the natural initial moisture of the used products, water does not necessarily have to be added, but is added preferably within the limits mentioned.

The pressure at the discharge end is advantageously up to 25 bars, and the temperature approximately 100° to 140° C. Because of these pressure and temperature conditions a reliable product sterilization and a dry granular ultimate consistency are achieved.

The invention also relates to an apparatus for carrying out the method according to the invention, comprising an extruder having a product feed zone, a mixing zone and a zone having return elements, it being provided in accordance with the invention that the return elements or return kneading units be arranged directly in front of the discharge end of the extruder and the discharge end of the extruder be open essentially without any reduction in cross-section relative to the free extruder cross-section. The extruder is preferably in the form of a twin shaft screw-type extruder driven in the same direction.

The return element, i.e. a screw section which conveys in the opposite direction to the conveying direction of the screw conveyors and has a pitch of reversed sign, comprises one or a plurality of spirals. It is advantageously provided that the return element have a length equal to 0.5 to 1.0 of the screw diameter and a pitch equal to 0.5 to 1.0 of the screw diameter.

The face of the discharge end of the return element and the face of the discharge end of the barrel lie in the same plane avoiding dead space. This means that the screw conveyors at the discharge end do not taper in the usual manner, with a dead space being left between the cylindrical walls of the barrel and the screw taper, but that the discharge end is designed virtually like a section cut through the barrel and screws or return elements so that the return elements extend radially until extending fully outwards. This ensures the pressure build-up as far as the outermost end of the barrel, which is required for the desired production of the discharge in granular form.

To avoid dead space, it is furthermore provided that the return elements are secured on the extruder screw shaft by means of a screw sunk in the face.

The achievement of the previously described constructional development of the end area on the discharge side is that the casein reacts fully to form caseinate and is sterilized. The resulting heat of reaction can be dissipated in a manner known per se by cooling the extruder barrel or by way of coolable screw shafts.

Further advantages and features of the invention will become apparent form the ensuing description of a preferred embodiment taken in conjunction with the drawings.

DESCRIPTION OF THE PREFERRED EMBODIMENT

Figure 1:
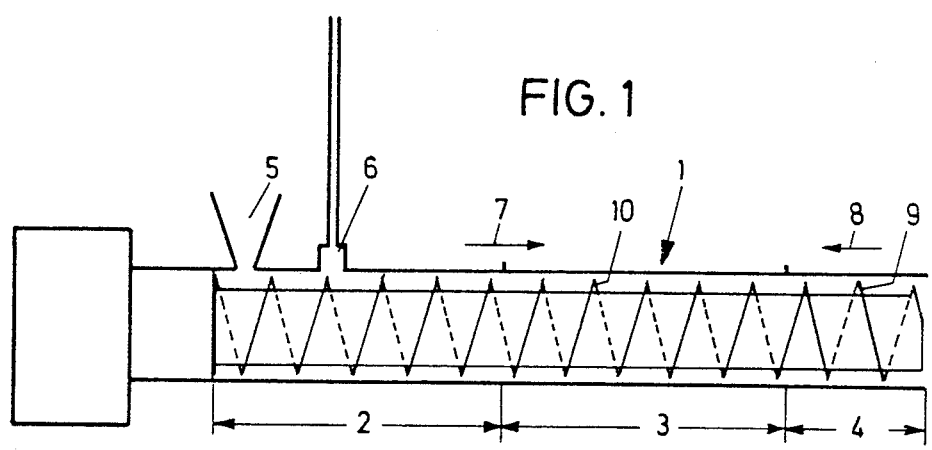
FIG. 1 is a diagrammatic longitudinal section through an extruder according to the invention.

FIG. 1 shows diagrammatically an extruder 1 which, in the exemplary embodiment, comprises three bolted together barrel sections, so-called barrel rings 2, 3 and 4.

The product feed zone is formed in the barrel section 2, casein being added to soda lye or alkali salts by way of a diagramatically illustrated feeder 5 and separate water being added via the feed pipe 6.

The extruder 1 in the exemplary embodiment is a twin screw extruder of the ZSK 70 type having a screw speed of 300 revolutions per minute.

The products introduced into the product feed zone (barrel section 2) are conveyed further in the direction of arrow 7 and mixed thoroughly in the mixing zone formed by the barrel section 3.

In the area of the barrel section 4 there are arranged return elements 9 which ensure a build-up of pressure and temperature by allowing a return force to act in the direction of arrow 8 on the arriving product. The return elements 9 have a pitch with a sign reverse to the remaining screw conveyor 10 of the extruder 1. They have a pitch equal to 0.5 to 1.5 D (D=extruder screw diameter) and a length equal to 0.5 to 1.0 D.

Figure 2:
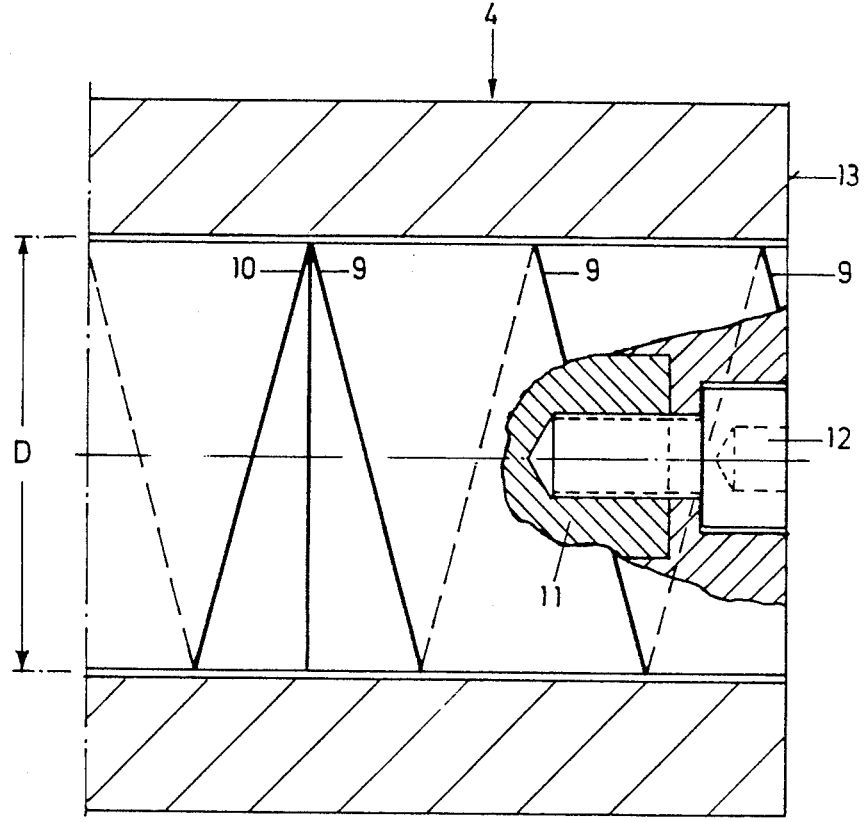
FIG. 2 is a view of the discharge end of the barrel corresponding to FIG. 1.

As is evident particularly from FIG. 2, the return elements are screwed on to the screw shaft 11 by means of a hexagon socket screw 12 sunk in this shaft.

The return elements 9 extend in the direction of and as far as the face 13 on the discharge side of the discharge end barrel section 4 over the entire diameter of the free interior of the barrel so that no dead space at all is left. The recessed screw arrangement prevents the forming of agglomerates in the fastening area. The free diameter D in the area of the barrel face 13 at the discharge end has a constant size, i.e. there is no extrusion die at all or the like, as is normally provided in the extrusion of caseinates by boiling.

Exemplary embodiment

There is provided a twin screw extruder of the ZSK 70 type which is driven at a screw speed of 300 revolutions per minute.

Casein in acid form having a water content of 9.5% and water, as well as water-free sodium carbonate, are fed to the extruder.

The throughput is 150 kg of casein per hour, 4.8 kg of sodium carbonate per hour and 7 l of water per hour.

During the neutralization reaction in the pressure build-up zone in front of the return elements 9, the ph value is increased to 6.6 to 6.8.

The mechanical energy supply is approximately 0.1 KWh/kg. The material temperature in the reaction zone (barrel section 4) is 138° C., and the material pressure is 10 bars.

At the discharge end a granular-like basic product is obtained which does not require any further comminution. The product can be transferred directly to a conveyor.

The discharged granular-like starting product has a grain size of 20 to 30 mm diameter and a moisture content of 6 to 15%.

What is claimed is:

1. Method of preparing caseinates comprising
   introducing of casein, alkaline solutions, or basic salts and water into an extruder,
   mixing the constituents thoroughly together and
   subjecting the mixed components to an increase in pressure and temperature under the influence of return elements,
   wherein the pressure build-up under the influence of said return elements or return kneading units takes place directly in front of the discharge end of the extruder and the product is discharged freely through this end of the extruder.

2. Method according to claim 1, wherein the mixture of constituents has a water content of between 6 and 15%.

3. Method according to claim 1, wherein the proportion of separately added water is between 0 and 18% relative to the total quantity of mixture in the extruder.

4. Method according to claim 1, wherein the pressure in front of the discharge end is up to 25 bars.

5. Method according to claim 1, wherein the temperature in front of the discharge end is 100° to 140° C.

6. An apparatus comprising an extruder having a product feed zone,
   preparing caseinates comprising and introducing a casein, alkaline solutions, or basic salts and water into said extruder,
   said extruder having a mixing zone for mixing the constituents thoroughly together and subjecting the mixed components to an increase in pressure and temperature under the influence of return elements,
   and said extruder including a zone having return elements and a discharge end, wherein the return elements (9) or return kneading units are arranged directly in front of the discharge end (face 13) of the extruder (1) wherein the pressure build-up under the influence of said return elements or return kneading units takes place directly in front of the discharge end of the extruder and the product is discharged freely through this end of the extruder, and the end of the extruder (1) on the discharge side being open essentially without any reduction in cross-section relative to the free cross-section (D) of the extruder.

7. Apparatus according to claim 6, wherein a twin shaft screw-type extruder (1) is driven in the same direction.

8. Apparatus according to claim 6, wherein the return elements (9) have a length equal to 0.5 to 1.0 D.

9. Apparatus according to claim 6, wherein the return elements (9) have a pitch equal to 0.5 to 1.5 D.

10. Apparatus according to claim 6, wherein the face of the return elements (9) at the discharge end and the face (13) of the discharge end of the barrel, while avoiding dead space, lie in the same plane and the return elements (9) extend over the entire cross-section (D) of the barrel section (4).

11. Apparatus according to claim 6, wherein the return element (9) is attached, at the discharge end, to the screw shaft (11) by means of a screw (12) sunk in the face of this shaft.

* * * * *